United States Patent [19]
Robinson

[11] Patent Number: 5,879,119
[45] Date of Patent: Mar. 9, 1999

[54] BUCKET ELEVATOR CONSTRUCTION BOLT

[75] Inventor: Christopher James Robinson, Groveland, Ill.

[73] Assignee: 4B Elevator Components Limited, E. Peoria, Ill.

[21] Appl. No.: 883,728

[22] Filed: Jun. 27, 1997

[51] Int. Cl.[6] .......................... F16B 35/06; F16B 39/282

[52] U.S. Cl. .......................... 411/399; 411/188; 411/424

[58] Field of Search ...................... 411/187, 188, 411/399, 424, 185

[56] References Cited

U.S. PATENT DOCUMENTS

| | | | |
|---|---|---|---|
| 519,411 | 5/1894 | North et al. | 411/399 X |
| 1,936,769 | 11/1933 | Olivet | 411/399 X |
| 1,968,516 | 7/1934 | Dieter | 411/399 |
| 2,056,688 | 10/1936 | Peterka et al. | 411/399 |
| 3,731,961 | 5/1973 | Becker | 411/399 X |

*Primary Examiner*—Neill Wilson
*Attorney, Agent, or Firm*—Kajane McManus

[57] ABSTRACT

The bucket elevator construction bolt comprises a flat head and a threaded shaft, the bolt further incorporating a collar adjacent the head, the collar including a plurality of elongate, radially arrayed spline teeth which engage within the material of the elevator belt, maintaining the bolt position against radial torque or vibratory forces applied thereto.

5 Claims, 1 Drawing Sheet

PRIOR ART

BUCKET ELEVATOR CONSTRUCTION BOLT

BACKGROUND OF THE INVENTION

The present invention relates to a bolt for use in engaging buckets of a bucket elevator to a driven belt of the bucket elevator. More particularly, the bolt includes an oversized spline toothed collar portion, the collar portion maintaining the bolt positioned for attachment of a nut thereto by engagement of the spline teeth within the material of the belt.

PRIOR ART

Various embodiments of a bolt for use in bucket elevator construction have been proposed.

All such bolts include a flat head portion which does not bear any tool engagement means. Such head must be as smooth as possible to avoid damaging drive means for the belt, over which the bolt heads ride.

Due to this requirement, engagement of the bolt securely during nut tightening or loosening has been a problem.

One proposed solution has been to provide teeth on the undersurface of the bolt head, which teeth bite into the material of the belt to maintain positioning. This approach has been found to cause tearing of the belt by the teeth, significantly decreasing the useful longevity of the belt.

Further, another embodiment has been proposed which provides a narrow radially splined band at the end of the bolt shaft, the band being engaged by a complex tool which holds the band in one position while a nut is threaded simultaneously onto the bolt. This is a very time consuming and cumbersome procedure which produces significant downtime during repair and/or maintenance.

SUMMARY OF THE INVENTION

Accordingly it is a primary object of the invention to provide a bolt for use in bucket elevator construction which does not decrease useful longevity of the belt while providing maintained position of the bolt during manipulation of a cooperating nut.

This object as well as others is met by the bolt of the present invention through provision thereon of a spline toothed collar on the shank of the bolt at a position adjacent the head thereof.

DESCRIPTION OF THE PREFERRED EMBODIMENT

Figure 1:
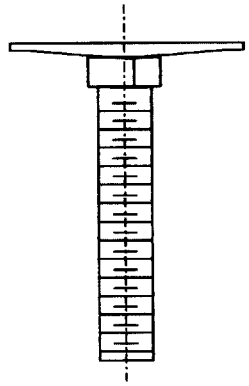
FIGS. 1–3 illustrate side views of various embodiments of prior art elevator bucket construction bolts.
Figure 2:
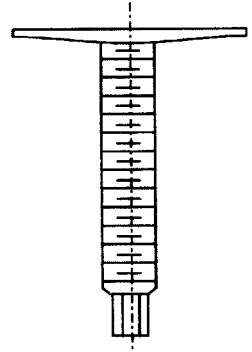
Figure 3:
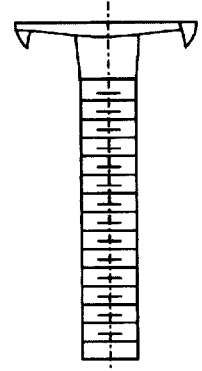

Referring now to the drawings in greater detail, FIGS. 1–3 illustrate various prior art embodiments of a bolt used in bucket elevator construction.

FIG. 1 presents a side view of a first embodiment including a square collar adjacent the bolt head commonly referred to as a Norway bolt. It has been found that the square configuration of the collar does not adequately engage the material of the belt when a high degree of torque is applied to a cooperating nut thereof.

FIG. 2 presents a side view of a second embodiment commonly referred to as an easy fit bolt. This bolt requires use of a specialized tool which holds the bolt in position by engaging a toothed band at a shaft end while manipulating a cooperating nut. This bolt is extremely expensive, as is the cooperating tool and the method of use is very time consuming.

FIG. 3 presents a side view of a further embodiment commonly referred to as a saber tooth bolt. A plurality of teeth are provided on the underside of the head which bite into the material of the belt. It has been found that the teeth produce tears in the belt material under high torque conditions, significantly reducing useful longevity of the belt.

Figure 4:
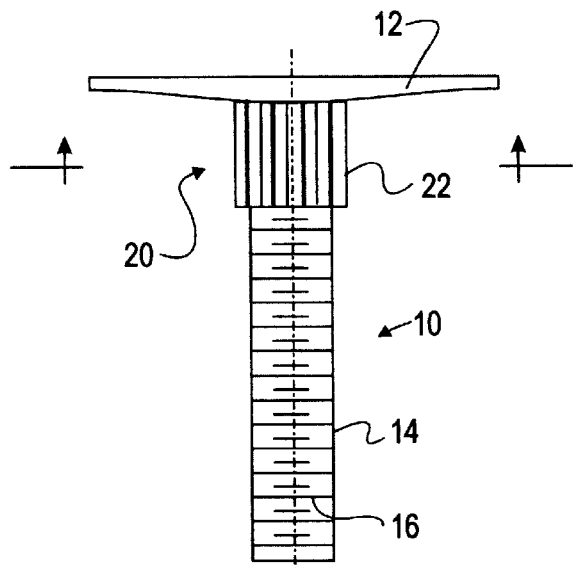
FIG. 4 is a side view of the spline toothed collar bolt of the present invention.
Figure 5:
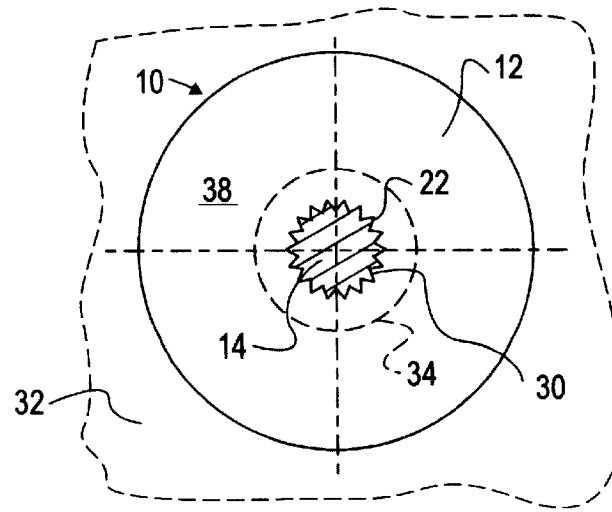
FIG. 5 is an end view of the bolt of FIG. 4 when viewed from the shaft end thereof, showing the spline toothed collar to be of greater diameter than the threaded bolt shaft.

Turning now to FIGS. 4 and 5, there is illustrated therein the bolt 10 of the present invention. As shown, the bolt 10 includes a flat head 12 and a shaft 14 extending perpendicularly therefrom. The shaft 14 is provided with threads 16 along a major portion of the length thereof, the threads 16 being provided for engaging a cooperating nut (not shown).

Adjacent the flat head 12 is provided a collar 20 which is of a diameter slightly greater than a diameter of the threaded shaft 14.

The collar 20 is formed having a plurality of splined teeth 22 thereon. The splined teeth 22 are elongate, each extending in length from the head 12 down the shaft 14 a predetermined distance defined by approximating a thickness of a driven belt of the bucket elevator (not shown).

The splined teeth 22 are radially arrayed about the collar 20, perpendicular to the threads 16 on the shaft 14, so that, when seated within a bolt hole 30 of a belt 32, they extend into the material of the belt 32 defining the periphery of the hole 30 as shown in phantom in FIG. 5.

The radial configuration of the teeth 22 provides resistance against rotational torque applied during manipulation of a cooperating nut 34 shown in phantom in FIG. 5, maintaining position of the bolt 10 during such nut 34 manipulation.

Further, due to the compressible nature of the material of the belt 32, when the nut 34 is forced against the material of the belt 32, the belt 32 material is squeezed against an abutting bottom surface 38 of the bolt head 12, the belt 32 material is deformed into the hole 30 defining space, creating a maximized contact with the teeth 22 of the collar 20 and virtually eliminating any possibility of rotation of the bolt 10.

Such nonrotation is a highly desired characteristic in the subject environment because of all the vibratory forces encountered during operation of a bucket elevator, the vibratory forces often causing loosening of the nut 34 and bolt 10 engagement and inherently requiring downtime for purposes of maintenance.

As described above, the bolt 10 of the present invention provides a number of advantage, some of which have been described above and others of which are inherent in the invention. Also, modifications may be proposed to the bolt 10 without departing from the teachings herein. Accordingly the scope of the invention is only to be limited as necessitated by the accompanying claims.

I claim:

1. A bucket elevator construction bolt comprising a shaft having a substantially planar head at one end thereof, the head having a flat top surface and a bottom surface, the bolt further including a splined tooth collar on the shaft thereof, extending along the shaft a predetermined distance from the bottom surface of the head, the collar being of a diameter larger than a diameter of said shaft, with each splined tooth extending radially outwardly of said collar, and the shaft being threaded from a point proximate the collar to a free end thereof.

2. The bolt of claim 1 wherein the collar extends a predetermined distance along a length of said shaft.

3. The bolt of claim 2 wherein each splined tooth extends across an entire length of said collar.

4. The bolt of claim 3 wherein each splined tooth is parallel to an adjacent splined tooth.

5. The bolt of claim 4 wherein each splined tooth is perpendicular to threads of the threaded shaft.

* * * * *